United States Patent
Peddi et al.

(10) Patent No.: US 12,212,190 B2
(45) Date of Patent: Jan. 28, 2025

(54) METHOD AND SYSTEM TO SUPPRESS TONAL NOISES OVER A WIDE SPEED RANGE IN ALTERNATING CURRENT ELECTRIC MACHINES

(71) Applicant: GM GLOBAL TECHNOLOGY OPERATIONS LLC, Detroit, MI (US)

(72) Inventors: Vinod Chowdary Peddi, Shelby Township, MI (US); Song He, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 454 days.

(21) Appl. No.: 17/743,928

(22) Filed: May 13, 2022

(65) Prior Publication Data
US 2023/0369948 A1    Nov. 16, 2023

(51) Int. Cl.
| | |
|---|---|
| *H02P 6/10* | (2006.01) |
| *B60L 15/20* | (2006.01) |
| *H02K 5/24* | (2006.01) |
| *H02K 11/20* | (2016.01) |
| *H02P 6/08* | (2016.01) |
| *H02P 21/18* | (2016.01) |
| *H02P 27/08* | (2006.01) |

(52) U.S. Cl.
CPC .............. *H02K 11/20* (2016.01); *B60L 15/20* (2013.01); *H02K 5/24* (2013.01); *H02P 6/08* (2013.01); *H02P 21/18* (2016.02); *H02P 27/08* (2013.01)

(58) Field of Classification Search
CPC .. H02P 21/18; H02P 6/08; H02K 5/24; H02K 11/20; B60L 15/20
USPC ..................................................... 318/400.23
See application file for complete search history.

(56) References Cited

U.S. PATENT DOCUMENTS

| | | | | |
|---|---|---|---|---|
| 2009/0296289 A1* | 12/2009 | Valdez | ...................... | H02H 3/17 361/47 |
| 2013/0147419 A1* | 6/2013 | Sakai | ...................... | H02M 1/44 318/722 |

* cited by examiner

*Primary Examiner* — Erick D Glass
(74) *Attorney, Agent, or Firm* — Quinn IP Law

(57) ABSTRACT

A method to suppress tonal noises over a wide speed range in an alternating current electric machine by current injection and voltage injection is provided. The method includes, within a computerized processor, monitoring a position sensor measuring a current electric machine frequency of the electric machine, comparing the current electric machine frequency to a sampling frequency of the position sensor, and operating one of a current injection mode and a voltage injection mode to suppress the tonal noises in the electric machine based upon the comparing.

20 Claims, 6 Drawing Sheets

METHOD AND SYSTEM TO SUPPRESS TONAL NOISES OVER A WIDE SPEED RANGE IN ALTERNATING CURRENT ELECTRIC MACHINES

INTRODUCTION

The disclosure generally relates to method and system to suppress tonal noises over wide speed range in alternating current electric machines by current injection and voltage injection.

An electric machine may convert electrical energy into mechanical or kinetic energy such as an output torque and may convert kinetic energy such as an input torque into electrical energy. An electric machine may be powered by alternating current. An electric machine may include a rotor and a stator, with a gap existing between the rotor and the stator.

SUMMARY

A method to suppress tonal noises over wide speed range in an alternating current electric machine by current injection and voltage injection is provided. The method includes, within a computerized processor, monitoring a position sensor generating a current electric machine frequency of the electric machine, comparing the current electric machine frequency to a sampling frequency of the position sensor, and operating one of a current injection mode and a voltage injection mode to suppress the tonal noises in the electric machine based upon the comparing.

In some embodiments, the method further includes, within the computerized processor, determining a harmonic order for the tonal noises in the electric machine to be suppressed based upon the current electric machine frequency and a torque of the electric machine. Operating one of the current injection mode and the voltage injection mode includes, when the current electric machine frequency is less than the sampling frequency of the position sensor divided by a factor times the harmonic order, modifying a fundamental voltage command for the electric machine with current injection, wherein the current injection is configured for suppressing tonal noises in the electric machine. Operating one of the current injection mode and the voltage injection mode further includes, when the current electric machine frequency is not less than the sampling frequency of the position sensor divided by the factor times the harmonic order, modifying the fundamental voltage command for the electric machine with voltage injection, wherein the voltage injection is configured for suppressing tonal noises in the electric machine. The factor is a calibrated value between 6 and 10.

In some embodiments, the factor is 8.

In some embodiments, the method further includes iteratively determining the harmonic order for the tonal noises to be suppressed and iteratively operating one of the current injection mode and the voltage injection mode based upon the iteratively determining the harmonic order.

In some embodiments, the method further includes monitoring a change in the current electric machine frequency and operating a transition between the current injection mode and the voltage injection mode based upon the change.

In some embodiments, operating the transition between the current injection mode and the voltage injection mode includes, within the computerized processor, determining a harmonic order for the tonal noises in the electric machine to be suppressed based upon the current electric machine frequency and a torque of the electric machine, defining a first electric machine frequency below which the current injection mode may be operated as the sampling frequency of the position sensor divided by a factor times the harmonic order, and defining a second electric machine frequency less than the first electric machine frequency. Operating the transition between the current injection mode and the voltage injection mode further includes defining a third electric machine frequency greater than the first electric machine frequency and when the current electric machine frequency is less than the second electric machine frequency, operating the current injection mode at full amplitude. Operating the transition between the current injection mode and the voltage injection mode further includes, when the current electric machine frequency is between the first electric machine frequency and the second electric machine frequency, operating the current injection mode with a reduced current command amplitude, wherein the reduced current command amplitude progressively ramps down to zero as the current electric machine frequency approaches the first electric machine frequency. Operating the transition between the current injection mode and the voltage injection mode further includes, when the current electric machine frequency is greater than the second electric machine frequency, operating the voltage injection mode at full amplitude. Operating the transition between the current injection mode and the voltage injection mode further includes, when the current electric machine frequency is between the first electric machine frequency and the third electric machine frequency, operating the voltage injection mode with a reduced voltage command amplitude, wherein the reduced voltage command amplitude progressively ramps down to zero as the current electric machine frequency approaches the first electric machine frequency. The factor is a calibrated value between 6 and 10.

In some embodiments, the current injection mode includes feedforward current commands and feedback voltage commands and the voltage injection mode includes feedforward voltage commands.

According to one alternative embodiment, a system to suppress tonal noises over a wide speed range in an alternating current electric machine by current injection and voltage injection is provided. The system includes the electric machine, a position sensor configured for monitoring operation of the electric machine, and a computerized current injection and voltage injection controller. The controller includes programming to monitor the position sensor measuring a current electric machine frequency of the electric machine, compare the current electric machine frequency to a sampling frequency of the position sensor, and operate one of a current injection mode and a voltage injection mode to suppress the tonal noises in the electric machine based upon the comparing.

In some embodiments, the computerized current injection and voltage injection controller further includes programming to determine a harmonic order for the tonal noises in the electric machine to be suppressed based upon the current electric machine frequency and a torque of the electric machine. Operating one of the current injection mode and the voltage injection mode includes, when the current electric machine frequency is less than the sampling frequency of the position sensor divided by a factor times the harmonic order, modifying a fundamental voltage command for the electric machine with current injection, wherein the current injection is configured for suppressing tonal noises in the electric machine. Operating one of the current injection mode and the voltage injection mode further includes, when the current electric machine frequency is not less than the sampling frequency of the position sensor divided by the factor times the harmonic order, modifying the fundamental voltage command for the electric machine with voltage injection, wherein the voltage injection is configured for suppressing tonal noises in the electric machine. The factor is a calibrated value between 6 and 10.

In some embodiments, the factor is 8.

In some embodiments, the computerized current injection and voltage injection controller further includes programming to iteratively determine the harmonic order for the tonal noises to be suppressed and iteratively operate one of the current injection mode and the voltage injection mode based upon the iteratively determining the harmonic order.

In some embodiments, the computerized current injection and voltage injection controller further includes programming to monitor a change in the current electric machine frequency and operate a transition between the current injection mode and the voltage injection mode based upon the change.

In some embodiments, operating the transition between the current injection mode and the voltage injection mode includes determining a harmonic order for the tonal noises in the electric machine to be suppressed based upon the current electric machine frequency and a torque of the electric machine and defining a first electric machine frequency below which the current injection mode may be operated as the sampling frequency of the position sensor divided by a factor times the harmonic order. Operating the transition between the current injection mode and the voltage injection mode further includes defining a second electric machine frequency less than the first electric machine frequency and defining a third electric machine frequency greater than the first electric machine frequency. Operating the transition between the current injection mode and the voltage injection mode further includes when the current electric machine frequency is less than the second electric machine frequency, operating the current injection mode at full amplitude. Operating the transition between the current injection mode and the voltage injection mode further includes, when the current electric machine frequency is between the first electric machine frequency and the second electric machine frequency, operating the current injection mode with a reduced current command amplitude, wherein the reduced current command amplitude progressively ramps down to zero as the current electric machine frequency approaches the first electric machine frequency. Operating the transition between the current injection mode and the voltage injection mode further includes, when the current electric machine frequency is greater than the second electric machine frequency, operating the voltage injection mode at full amplitude. Operating the transition between the current injection mode and the voltage injection mode further includes, when the current electric machine frequency is between the first electric machine frequency and the third electric machine frequency, operating the voltage injection mode with a reduced voltage command amplitude, wherein the reduced voltage command amplitude progressively ramps down to zero as the current electric machine frequency approaches the first electric machine frequency. The factor is a calibrated value between 6 and 10.

In some embodiments, the current injection mode includes feedforward current commands and feedback voltage commands, and the voltage injection mode includes feedforward voltage commands.

According to one alternative embodiment, a system to suppress tonal noises in a vehicle over a wide speed range in an alternating current electric machine by current injection and voltage injection is provided. The system includes the vehicle including the electric machine, a position sensor configured for monitoring operation of the electric machine, and a computerized current injection and voltage injection controller. The controller includes programming to monitor the position sensor measuring a current electric machine frequency of the electric machine, compare the current electric machine frequency to a sampling frequency of the position sensor, and operate one of a current injection mode and a voltage injection mode to suppress the tonal noises in the electric machine based upon the comparing.

In some embodiments, the computerized current injection and voltage injection controller further includes programming to determine a harmonic order for the tonal noises in the electric machine to be suppressed based upon the current electric machine frequency and a torque of the electric machine. Operating one of the current injection mode and the voltage injection mode includes, when the current electric machine frequency is less than the sampling frequency of the position sensor divided by a factor times the harmonic order, modifying a fundamental voltage command for the electric machine with current injection, wherein the current injection is configured for suppressing tonal noises in the electric machine. Operating one of the current injection mode and the voltage injection mode further includes, when the current electric machine frequency is not less than the sampling frequency of the position sensor divided by the factor times the harmonic order, modifying the fundamental voltage command for the electric machine with voltage injection, wherein the voltage injection is configured for suppressing tonal noises in the electric machine. The factor is a calibrated value between 6 and 10.

In some embodiments, the computerized current injection and voltage injection controller further includes programming to iteratively determine the harmonic order for the tonal noises to be suppressed and iteratively operate one of the current injection mode and the voltage injection mode based upon the iteratively determining the harmonic order.

In some embodiments, the computerized current injection and voltage injection controller further includes programming to monitor a change in the current electric machine frequency and operate a transition between the current injection mode and the voltage injection mode based upon the change.

In some embodiments, operating the transition between the current injection mode and the voltage injection mode includes determining a harmonic order for the tonal noises in the electric machine to be suppressed based upon the current electric machine frequency and a torque of the electric machine and defining a first electric machine frequency below which the current injection mode may be operated as the sampling frequency of the position sensor divided by a factor times the harmonic order. Operating the transition between the current injection mode and the voltage injection mode further includes defining a second electric machine frequency less than the first electric machine frequency and defining a third electric machine frequency greater than the first electric machine frequency. Operating the transition between the current injection mode and the voltage injection mode further includes, when the current electric machine frequency is less than the second electric machine frequency, operating the current injection mode at full amplitude. Operating the transition between the current injection mode and the voltage injection mode further includes, when the current electric machine frequency is between the first electric machine frequency and the second electric machine frequency, operating the current injection mode with a reduced current command amplitude, wherein the reduced current command amplitude progressively ramps down to zero as the current electric machine frequency approaches the first electric machine frequency. Operating the transition between the current injection mode and the voltage injection mode further includes, when the current electric machine frequency is greater than the second electric machine frequency, operating the voltage injection mode at full amplitude. Operating the transition between the current injection mode and the voltage injection mode further includes, when the current electric machine frequency is between the first electric machine frequency and the third electric machine frequency, operating the voltage injection mode with a reduced voltage command amplitude, wherein the reduced voltage command amplitude progressively ramps down to zero as the current electric machine frequency approaches the first electric machine frequency. The factor is a calibrated value between 6 and 10.

The above features and advantages and other features and advantages of the present disclosure are readily apparent from the following detailed description of the best modes for carrying out the disclosure when taken in connection with the accompanying drawings.

DETAILED DESCRIPTION

Figure 1:
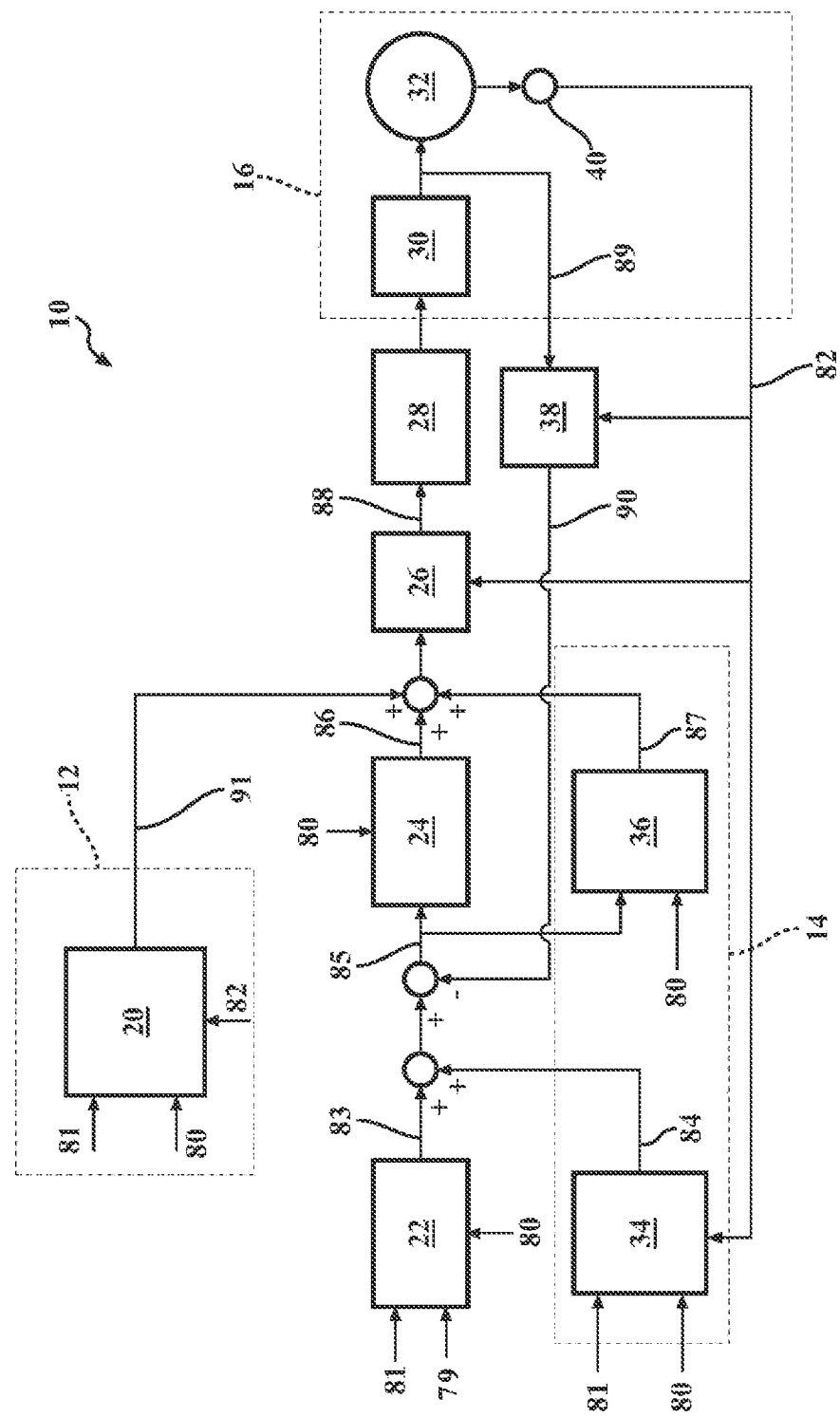
FIG. 1 schematically illustrates a system useful to suppress tonal noises over wide speed range in alternating current electric machines by current and voltage injection, in accordance with the present disclosure.

An electric machine includes a rotor and a stator, with an airgap between the rotor and stator. Magnetic flux density harmonics in an airgap of an electric machine may create vibrations which may be perceptible as a tone.

The harmonics of the flux density of the rotor generate oscillating field forces at specific spatial orders, which cause vibration excitations resulting in tonal noises. To improve the acoustics, these field forces can be compensated by superposition of a phase-shifted force of the same spatial order by use of appropriate current.

A method and system are provided to suppress tonal noises over wide speed range in alternating current (AC) machines by utilizing current injection in a first speed range of the electric machine and voltage injection in a second speed range of the electric machine. Operation of the electric machine may be monitored by a position sensor. The position sensor includes a sampling rate or a sampling frequency at which data is cyclically generated. Current injection may be used to modulate operation of the electric machine when the electric machine frequency is less than a calibratable value based upon the sampling frequency of the position sensor (See Equation 1). Voltage injection method may alternatively be used when the electric machine frequency or synchronous frequency is greater than the calibratable value.

Beyond a certain synchronous frequency, the harmonic current controllers are unstable due to discrete effects caused by sampling frequencies. The synchronous frequency of an electric machine is the speed of the revolution of the magnetic field created by the stator of the electric machine. In order to extend the operating frequency range of the disclosed system and method to suppress tonal noises, open loop voltage injection method is employed, which is not susceptible to sampling frequency limitation.

A comparison of the frequency of the electric machine to the sampling frequency of the sensor monitoring the electric machine may be defined according to Equation 1.

$$\frac{F_s}{H_x F_e} = K_{factor} \quad [1]$$

The term $F_S$ is the sampling frequency. The term Fe describes motor synchronous frequency. The term $H_X$ describes harmonic order used. In one embodiment, the harmonic order of the tone to be controlled or suppressed may frequently be 6, 12, or 18, ($H_1$ may be 6, $H_2$ may be 12, etc.) which are common order with alternating current electric machines. The $K_{factor}$ term is a calibratable value based upon a discreet version of the controller used (reference Equations 16 and 17). The $K_{factor}$ term may range from values of 6 to 10, with a nominal value of 8 being common. Additionally, an algorithm may be utilized to smoothly transition between current injection and voltage injection methods. The algorithm may be configured for multiple harmonics without a limitation of the controller due to discrete effects caused by sampling frequency allowing for wide speed tonal noise suppression. Restating the Equation 1, one may say that current injection may be employed while the frequency of the electric machine is less than the sampling frequency of the sensor monitoring the electric machine divided by a calibratable factor times the harmonic order of the tonal noise to be suppressed.

Electromagnetic forces in the air gap can be evaluated from the flux density using the Maxwells Stress Tensor, defined in Equations 2-5.

$$\sigma = \sigma_{rad} + j\sigma_{tan} = \frac{B^2}{2\mu_0} \quad [2]$$

$$B = B_{rad} + jB_{tan} \quad [3]$$

$$\sigma_{rad} = \frac{B_{rad}^2 - B_{tan}^2}{2\mu_0} \quad [4]$$

$$\sigma_{tan} = \frac{B_{rad}B_{tan}}{\mu_0} \quad [5]$$

The term $\sigma_{rad}$ describes radial force density. The term $\sigma_{tan}$ describes tangential force density. The term $B_{rad}$ describes radial flux density. The term $B_{tan}$ describes tangential flux density. The term $\mu_0$ describes permeability of free space.

Radial forces resulting from $\sigma_{rad}$ play a role in exciting stator breathing modes, which may control the tonal electric motor whine or tonal noise at higher frequency. The tangential forces and torque ripple caused by $\sigma_{tan}$ can couple with stator torsional modes, which may be a factor in low frequency electric motor noise.

If radial forces at high frequencies are considered, radial force density can be represented by Equation 6.

$$\sigma_{rad} = \frac{B_{rad}^2}{2\mu_0} \quad [6]$$

The distribution of the radial flux density can be expressed by a superposition of armature-related magnetomotive force (MMF), which is a function of the stator current, and MMF created by the permanent magnets as is described by Equation 7.

$$B(\theta_e, t) = [F_a(\theta_e, t) + F_{pm}(\theta_e, t)]\Gamma(\theta_e, t) \quad [7]$$

with the permeance function $\Gamma$ and the spatial angular position in the air gap $\theta_e$. $(\theta, t)$ describes radial flux density. $F_a(\theta, t)$ describes time dependent spatial magnetomotive force (MMF) of the armature current. $F_{pm}(\theta, f)$ describes time dependent spatial MMF of the permanent magnet.

The time dependent spatial MMF distribution of the permanent magnets is approximated by Equation 8.

$$F_{pm}(\theta, t) = \Sigma_n F_{pm,n} \cos(n\omega t - np\theta_e - \phi_n) \quad [8]$$

The term $F_{pm}$ describes a MMF distribution of the permanent magnet. The term n describes a spatial harmonic order. The term t describes time. The term $\omega$ describes angular frequency. The term $\theta_e$ describes angular position in the airgap. The term $\phi_n$ describes a phase of spatial order. The term p describes time harmonic order. The time dependent spatial MMF distribution generated by the phase currents:

$$F_a(\theta, t) = \Sigma_m F_{a,m} \cos(\omega t - mp\theta_e - \phi_m) \quad [9]$$

The term m describes the spatial order of MMF generated by phase currents. The term $\phi_m$ describes phase of the spatial order.

In three-phase machines, a current generated flux-density distribution in the air gap may be described by Equation 9, wherein m=6 k+1, wherein k may be 1, 2, 3, etc. Additional harmonics of order m=x can occur in fractional slot windings and tooth coil windings. Since they are dependent on winding function, they are ignored here. Current induced field forces may be determined with Equation 6 and Equation 9.

The harmonics of the flux density of the rotor generate oscillating field forces at specific spatial orders, which cause vibration excitations resulting in tonal noises. To improve the acoustics, these field forces may be compensated by superposition of a phase-shifted force of the same spatial order by use of appropriate current.

In most machines with concentrated windings harmonic currents of orders −5 and 7 can be used to compensate the forces by super positioning of a phase-shifted force of spatial order. The values −5 and 7 are an example that leads to 6th order as described herein below. Similarly, the values −11 and 13 are another example that leads to 12th order in the dq reference frame.

If the fundamental current is superposed with a harmonic order of −5 and 7, the overall MMF may be described by Equation 10.

$$F_a(\theta, t) = \Sigma_{m1}\Sigma_{m2}\Sigma_{m3}F_{a,m1}\cos(\omega t - m1p\theta_e - \phi_{m1}) + F_{a,m2}\cos(-5\omega t - m2p\theta_e - \phi_{m2}) + F_{a,m}\cos(7\omega t - m3p\theta - \phi_{m3}) \quad [10]$$

The terms m1, m2, and m3 are spatial orders of MMF generated by phase currents analogous to m defined in Equation 9. If the force density is calculated using Equation 6, meaning radial forces at high frequencies are considered, it contains a term with frequencies 6 kw where k=1,2,3. This corresponds to a homogenous force distribution in the airgap, which oscillates at frequencies 6 kw where k=1,2,3.

If a phase shift and amplitude of currents −5 and 7 are applied, the force oscillations can be compensated, as is described by Equations 11, 12, and 13.

$$I_{a\_hx} = I_{a5}\cos(5\theta_e + \phi_5) + I_{a7}\cos(7\theta_e + \phi_7) \quad [11]$$

$\theta_e$ describes angular position. $\phi_5$ describes phase of 5th order harmonic. $\phi_7$ describes phase of 7th order harmonic. $I_{a5}$ describes amplitude of 5th order for Ia (motor phase a). Similarly motor b and c phase amplitudes are defined.

$$I_{b\_hx} = I_{b5}\cos\left(5\left(\theta_e - \frac{2\pi}{3}\right) + \phi_5\right) + I_{b7}\cos\left(7\left(\theta_e - \frac{2\pi}{3}\right) + \phi_7\right) \quad [12]$$

$$I_{c\_hx} = I_{c5}\cos\left(5\left(\theta_e - \frac{4\pi}{3}\right) + \phi_5\right) + I_{c7}\cos\left(7\left(\theta_e - \frac{4\pi}{3}\right) + \phi_7\right) \quad [13]$$

wherein abc to dq reference frame transform leads to:

$$I_{d\_Hx} = I_{dHx6}\sin(6\theta_e + \phi_{d6}) \quad [14]$$

$$I_{q\_Hx} = I_{qHx6}\cos(6\theta_e + \phi_{q6}) \quad [15]$$

$I_{dHx6}$ describes d axis amplitude. $I_{qHx6}$ describes q axis amplitude. $\phi_{d6}$ describes d axis phase. $\phi_{q6}$ describes q axis phase. In Equations 11, 12, and 13, −5 and 7 are taken as example in stationary reference frame. These values lead to 6th order in dq reference frame in Equations 14 and 15. Similarly, one could configure −11 and 13 in stationary reference frame which leads to $12^{th}$ order in dq reference frame.

$$V_{d\_Hx} = V_{dHx6}\sin(6\theta_e + \phi_{d6}) \quad [16]$$

$$V_{q\_Hx} = V_{qHx6}\cos(6\theta_e + \phi_{q6}) \quad [17]$$

$V_{dHx6}$ describes d axis amplitude. $V_{qHx6}$ describes q axis amplitude. Equations 16 and 17 are provided for an exemplary $6^{th}$ harmonic and may be similarly configured for other harmonics such as $12^{th}$, $18^{th}$, etc. These harmonic current commands can be applied to a motor control system and controlled using a harmonic current regulator. The harmonic current regulator is typically operational up to sampling to harmonic frequency ratios of about $K_{factor}$ (Fs/HX*Fe), as is described by Equation 1.

A synchronous current regulator to control the fundamental component may be a complex vector style proportional integral (PI) regulator, as described by Equation 16.

$$G_c(s) = K_{pdq} + \frac{K_{idq} + j\omega_e K_{ppdq}}{s} \quad [18]$$

Kpdq and Kidq are the gains of d axis and q axis controller (represented in vector form). A harmonic current regulator may be configured according to Equation 17.

$$G_{cHx}(s) = \frac{s(K_{pdq}s + K_{idq})}{s^2 + (jHx\omega_e)^2} \qquad [19]$$

Up to a certain electric machine synchronous frequency, current injection may be utilized to control tonal noises by reducing field forces. The principle of reducing field forces still holds with voltage injection. Current injection methods control harmonic currents by applying voltage to the inverter and motor. The same voltage from current control system can also be applied in an open loop fashion at a phase angle to suppress tonal noise while using voltage injection methods.

Feedforward voltage and current commands described herein be obtained through finite element analysis (FEA) and further calibrated against measured noise data while optimizing for low current and voltage magnitude and tonal noise suppression. The feedforward commands are varied as a function of torque and frequency to account for the operating point variation of flux harmonics and account for the vibration/tonal noise response of the machine.

Referring now to the drawings, wherein like reference numbers refer to like features throughout the several views, FIG. 1 schematically illustrates a system 10 useful to suppress tonal noises over wide speed range in alternating current electric machines by current and voltage injection. The system 10 may be described as a discreet control system. The system 10 includes a control portion 14 including a feedforward harmonic current generation module 34 and harmonic current regulators 36. The control portion 14 is useful to control current injection. The system 10 additionally includes a control portion 12 including a feedforward harmonic voltage generation module 20. The control portion 12 is useful to control voltage injection. The system 10 additionally includes a torque to current conversion module 22, a synchronous current regulator module 24, a dq to abc reference frame transform module 26, a pulse width modulation (PWM) generation module 28, and an abc to dq reference frame transform module 38. The dq to abc reference frame transform module 26 transforms data from a rotational frame of reference to a three phase (abc) signal and may be described as performing an inverse Park Transform. The abc to dq reference frame transform module 38 transforms data from a three phase (abc) signal to a rotational frame of reference and may be described as performing a Park Transform. A physical system 16 is additionally illustrated, including a PWM inverter 30, and electric machine 32, and a position sensor 40 configured for monitoring operation of the electric machine 32.

In the dq or rotational frame of reference, terms or signals may be described as related to a d axis and a q axis. Throughout the disclosure, terms describing flux contributed by three separate sinusoidal phase quantities may be described in terms of the d axis and the q axis. The d axis may be described as the direct axis or the axis by which flux is produced by the field winding. The q axis may be described as the quadrature axis or the axis on which torque is produced. The q axis leads the d axis electrically by 90 degrees. The d axis may be described as the main flux direction. The q axis may be described as the main torque producing direction.

Various signals are illustrated being monitored and generated by components of the system 10 of FIG. 1. Signal 79 is a $V_{dc}$ signal or a direct current (DC) bus voltage. Signal 80 is an We signal or electric machine synchronous frequency signal. Signal 81 is a $T_e^*$ signal or a commanded electric machine torque signal. Signal 82 is a $\theta_e$ signal or an angular position signal describing operation of the electric machine. Signal 83 is an $I_{dq}^*$ signal or current commands responsible for supplying the commanded electric machine torque. Signal 84 is an $I_{dqHx}^*$ signal or harmonic current commands useful to reduce or suppress tonal noises. Signal 85 is a $I_{dq,Err}$ signal or an error signal based upon the commanded versus measured current. Signal 86 is a $V_{dq,f}^*$ signal or a fundamental voltage command provided by the controller and responsible for obtaining the commanded electric machine torque. Signal 87 is a $V_{dqHx,CM}^*$ signal or a voltage command provided by the harmonic current regulators 36. Signal 88 is a $V_{abc}$ signal or a voltage command in a stationary reference frame ($V_a$ is phase A, $V_b$ is phase B, and $V_c$ is phase C). Signal 89 is an $I_{abc}$ signal or measured abc currents ($I_a$ is phase A, $I_b$ is phase B, and $I_c$ is phase C). Signal 90 is an $I_{dq}$ signal or measured current in a synchronous or dq reference frame. Signal 91 is a $V_{dqHx,VM}^*$ signal or a voltage output from the feedforward harmonic voltage generation module 20.

Figure 2:
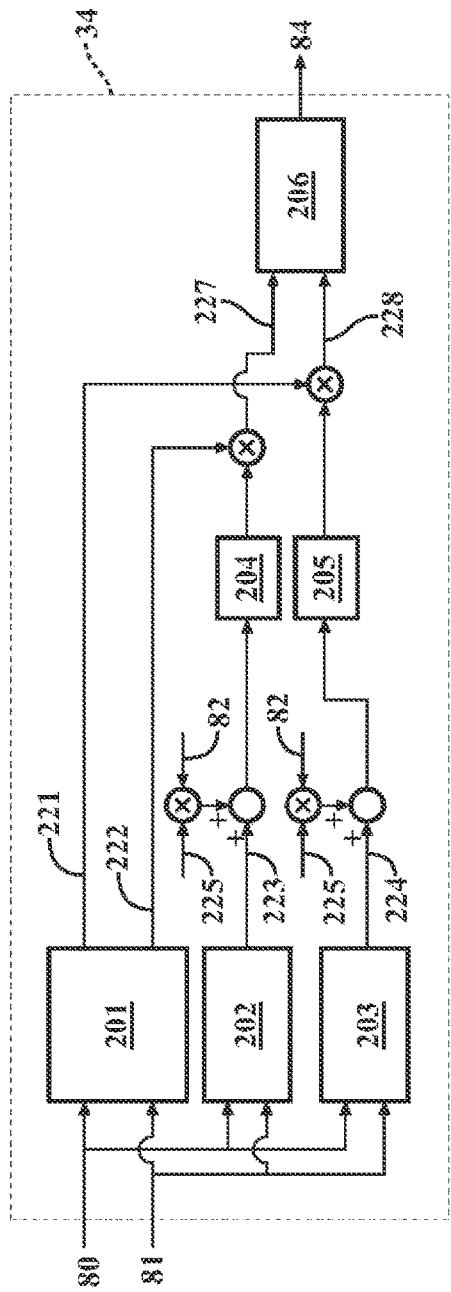
FIG. 2 schematically illustrates feedforward harmonic current generation as provided by the feedforward harmonic current generation module of FIG. 1, in accordance with the present disclosure.

FIG. 2 schematically illustrates feedforward harmonic current generation as provided by the feedforward harmonic current generation module 34 of FIG. 1. The feedforward harmonic current generation module 34 is illustrated including a current magnitude look up table module 201, a d axis phase look up table module 202, and a q axis phase look up table module 203. The feedforward harmonic current generation module 34 is illustrated further including a SIN transform module 204, a COS transform module 205, and a scalar to vector transform module 206.

Various signals are illustrated being monitored and generated by components of the feedforward harmonic current generation module 34 of FIG. 2. Signal 80 is an We signal. Signal 81 is a $T_e$ signal. Signal 82 is a $\theta_e$ signal. Signal 221 is an $I_{dHx6}$ signal. Signal 222 is an $I_{qHx6}$ signal. Signal 223 is a $\Phi_{dHx}$ signal. Signal 224 is a $\Phi_{qHx}$ signal. Signal 225 is an HX signal. Signal 227 is an $I_{dHx}$ signal. Signal 228 is an $I_{qHx}$ signal. Signal 84 is an $I_{dqHx}^*$ signal.

Figure 3:
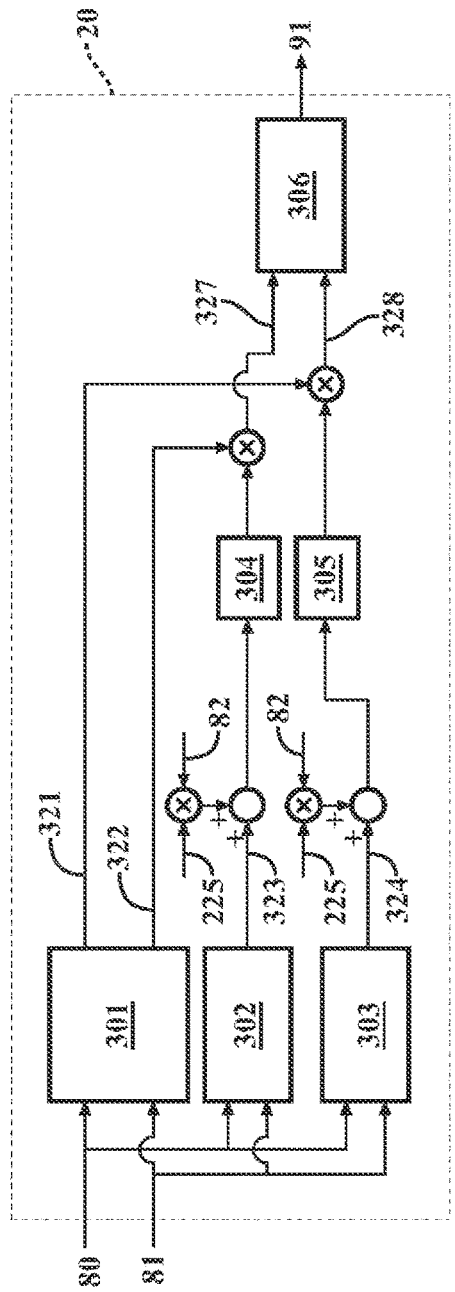
FIG. 3 schematically illustrates feedforward harmonic voltage generation as provided by the feedforward harmonic voltage generation module of FIG. 1, in accordance with the present disclosure.

FIG. 3 schematically illustrates feedforward harmonic voltage generation as provided by the feedforward harmonic voltage generation module 20 of FIG. 1. The feedforward harmonic voltage generation module 20 is illustrated including a current magnitude look up table module 301, a d axis phase look up table module 302, and a q axis phase look up table module 303. The feedforward harmonic current generation module 34 is illustrated further including a SIN transform module 304, a COS transform module 305, and a scalar to vector transform module 306.

Various signals are illustrated being monitored and generated by components of the feedforward harmonic voltage generation module 20 of FIG. 3. Signal 80 is an We signal. Signal 81 is a $T_e$ signal. Signal 82 is a $\theta_e$ signal. Signal 321 is a $V_{dHx}$ signal or a D axis voltage amplitude of specific harmonic, as defined in Equations 16 and 17. Signal 322 is a $V_{qHx}$ signal. Signal 323 is a $\Phi_{dHx}$ signal or a phase of the voltage injected. Signal 324 is a $\Phi_{qHx}$ signal. Signal 225 is an HX signal. Signal 327 is a $V_{dHx}$ signal. Signal 328 is an $V_{qHx}$ signal. Signal 91 is an $V_{dqHx}^*$ signal.

The feedforward current and voltage commands referenced in FIGS. 2 and 3, respectively, may be obtained through FEA analysis and further calibrated against measured noise data while optimizing for low current and voltage magnitude and tonal noise suppression. The feedforward commands are varied as a function of electric machine torque and electric machine frequency to account for the operating point variation of flux harmonics and account for the vibration/tonal noise response of the electric machine 32 of FIG. 1.

Figure 4:
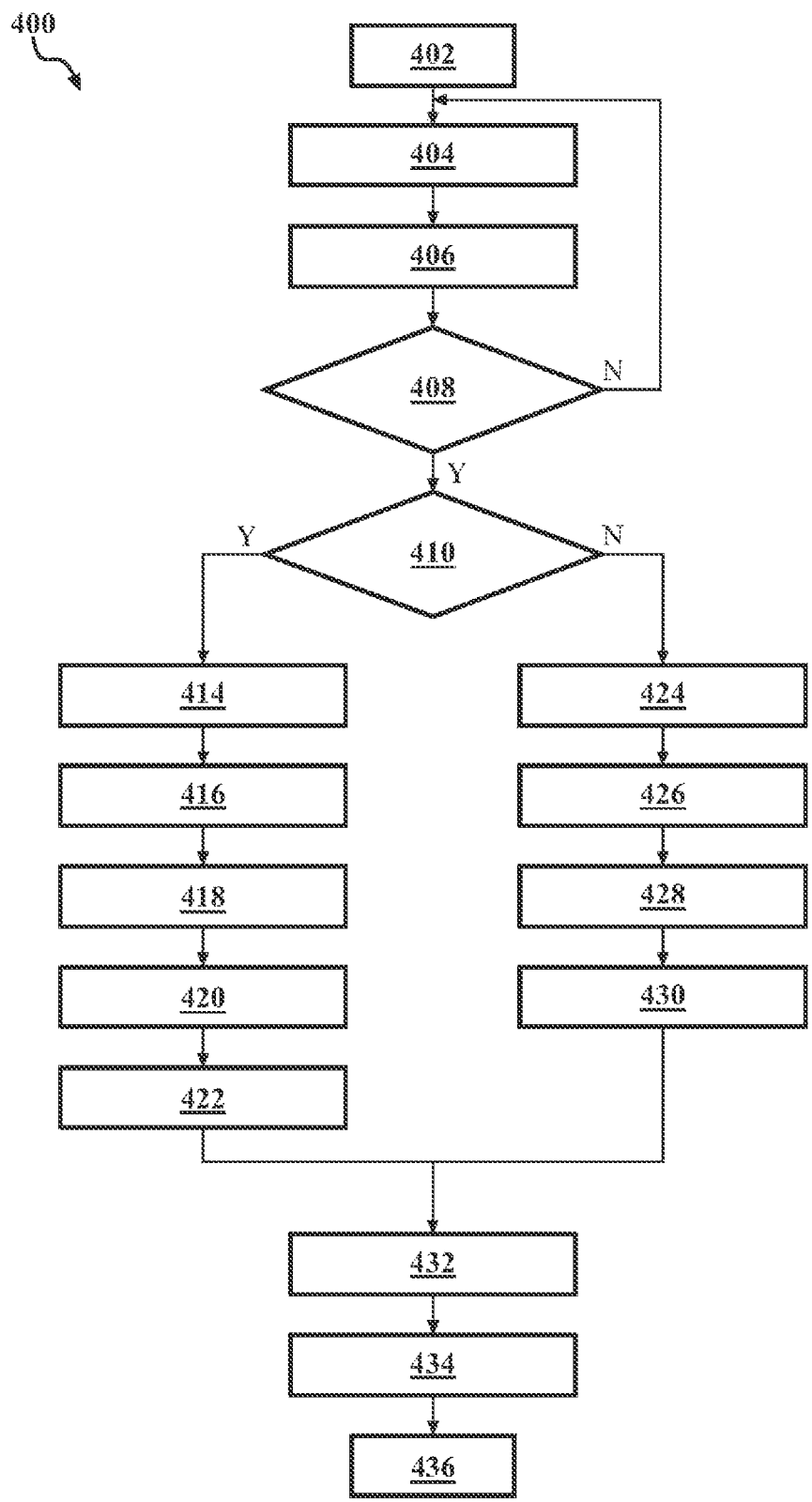
FIG. 4 is a flowchart illustrating an exemplary method to suppress tonal noises over wide speed range in an alternating current electric machine by current injection and voltage injection, in accordance with the present disclosure.

FIG. 4 is a flowchart illustrating an exemplary method 400 to suppress tonal noises over wide speed range in an alternating current electric machine by current injection and voltage injection. The method 400 starts at step 402. At step 404, a tonal noise or harmonic tone to be suppressed is selected. This selection may be dynamic, for example, with different tones being issues at different electric machine torques and frequencies. For example, an electric machine may be operating in one state, where a fifth order tone is an issue and may be suppressed. That electric machine may then be commanded to change one of the frequency or the torque to a second state. In that second state, the fifth order tone may no longer be an issue, and instead a seventh order tone may be suppressed. The method 400 may be iterated periodically or based upon changes in electric machine operating state.

At step 406, a ratio is calculated based upon a sampling frequency of a position sensor monitoring operation of the electric machine divided by the electric machine synchronous frequency times the harmonic order of the tone being suppressed. At step 408, a determination is made whether a modulation index is less than a threshold. The modulation index, defined by term m, may be described by Equation 20.

$$m = \frac{V_{peak}}{\frac{2}{\pi}V_{dc}} \quad [20]$$

The term $V_{dc}$ is a DC bus voltage. $V_{peak}$ is a peak fundamental voltage generated by the controller or a peak value of signal 88 of FIG. 1. The value m describes a ratio of peak fundamental voltage commanded by the controller over the DC bus voltage. If m is less than the threshold, current injection and voltage injection methods described herein may be utilized, and the method 400 advances to step 410. If m is greater than the threshold, current injection and voltage injection methods are disabled, and the method 400 returns to step 404. At step 410, a determination is made whether the ratio determined in step 406 is less than a threshold. The threshold may be predetermined according to Equation 1. If the ratio is less than the threshold, the method 400 advances to step 414. If the ratio is not less than the threshold, the method advances to step 424.

Steps 414, 416, 418, 420, and 422 illustrate use of current injection to suppress the tonal noise or harmonic tone. At step 414, current injection is enabled. At step 416, d axis current magnitude and phase are calculated as a function of electric machine torque and electric machine frequency. At step 418, current magnitude d axis current magnitude and phase are calculated as a function of electric machine torque and electric machine frequency. At step 420, a harmonic current regulator is utilized as disclosed herein. At step 422, a harmonic voltage command is generated.

Steps 424, 426, 428, and 430 illustrate use of voltage injection to suppress the tonal noise or harmonic tone. At step 424, voltage injection is enabled. At step 426, d axis voltage magnitude and phase are calculated as a function of electric machine torque and electric machine frequency. At step 428, voltage magnitude d axis current magnitude and phase are calculated as a function of electric machine torque and electric machine frequency. At step 430, a harmonic voltage command is generated.

At step 432, the harmonic voltage command generated at either step 422 or step 430 is added to a fundamental voltage command. The fundamental voltage command is the voltage command that is generated to control the electric machine based upon system or vehicle considerations and requests, such as an output torque request to be provided by the electric machine. By adding the harmonic voltage command to the fundamental voltage command, the benefits of tonal noise suppression described herein may be realized. At step 434, PWM is generated and applied to a power inverter supplying electrical energy to the electric machine being controlled. At step 436, the method 400 ends. The method 400 may be applied iteratively while the electric machine is being operated. A number of alternative or additional method steps are envisioned for use with the method 400, and the disclosure is not intended to be limited to the exemplary method steps described herein.

Figure 5:
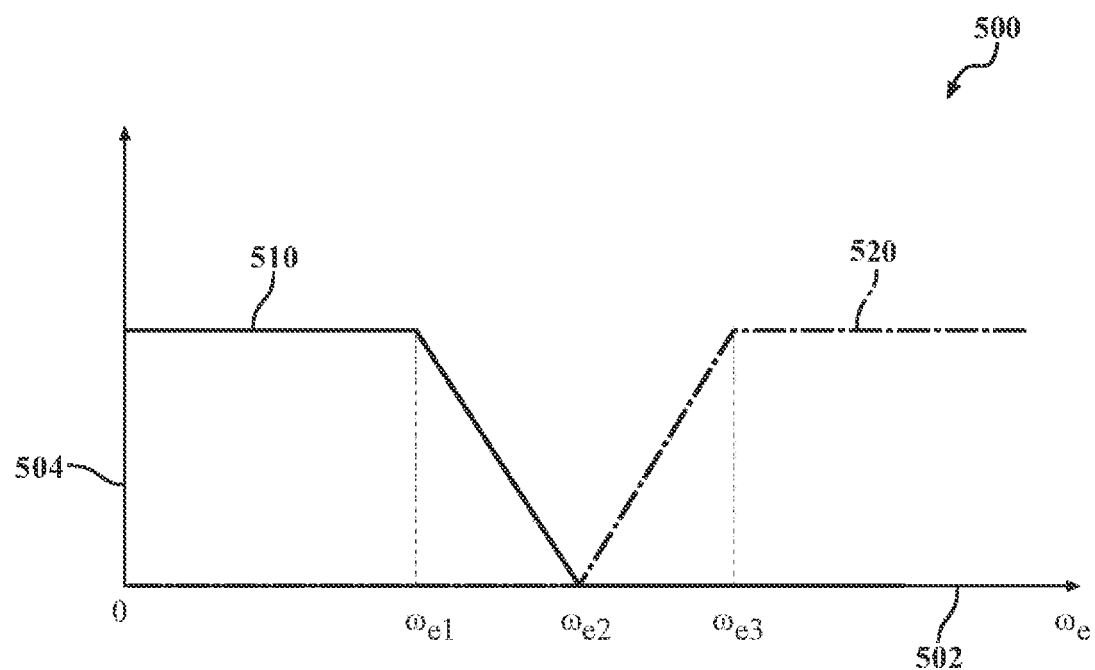
FIGS. 5 and 6 are graphs illustrating operation of the system of FIG. 1 and a control method to combine and transition between a current injection mode and a voltage injection mode based upon a frequency of the electric machine of FIG. 1, in accordance with the present disclosure.
Figure 6:
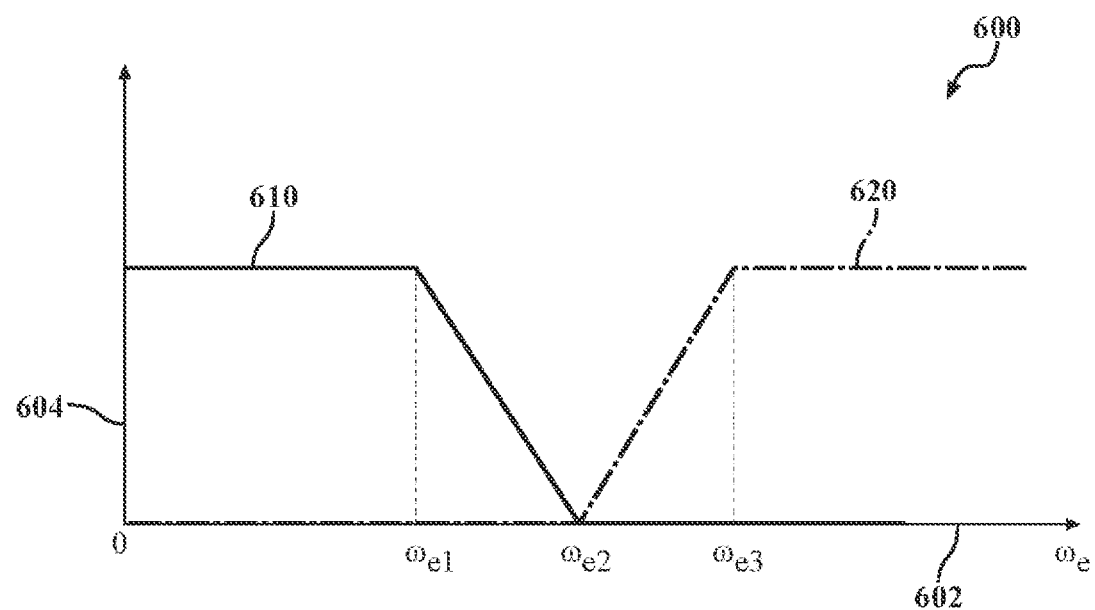

FIGS. 5 and 6 are graphs illustrating operation of the system 10 of FIG. 1 and a control method to combine and transition between a current injection mode and a voltage injection mode based upon a frequency of the electric machine 32 of FIG. 1. FIG. 5 illustrates graph 500 including amplitude of current and voltage commands versus electric machine frequency. A vertical axis 504 illustrates an amplitude of current and voltage commands. A horizontal axis 502 illustrates an electric machine frequency, $\omega_e$. As defined by Equation 1, a current injection mode may be operated when an electric machine frequency is less than a sampling frequency of a position sensor monitoring the electric machine divided by a $K_{factor}$ times a harmonic order of a tone to be suppressed. A selected electric machine frequency, $\omega_{e2}$, represents an electric machine frequency equal to the sampling frequency of the sensor 40 of FIG. 1 monitoring operation of the electric machine 32 divided by a $K_{factor}$ times the harmonic order of the tone to be suppressed. Within an electric machine frequency range less than $\omega_{e2}$, the disclosed system may operate in a current injection mode. Within an electric machine frequency range greater than $\omega_{e2}$, the disclosed system may operate in a voltage injection mode. According to the control method of FIG. 5, a $\omega_{e1}$ value may be defined where a ramping down of the amplitude of current commands may begin to be utilized, with the amplitude of the current commands incrementally reducing as an increasing electric machine frequency approaches $\omega_{e2}$. Similarly, a $\omega_{e3}$ value may be defined, where the amplitude of voltage commands ramps up as the electric machine frequency increases past $\omega_{e2}$, with the amplitude of voltage commands reaching a maximum value at $\omega_{e3}$. Plot 510 is illustrated, showing an amplitude of current commands generated by the feedforward harmonic current generation module 34 of FIG. 1. Plot 520 is illustrated, showing an amplitude of voltage commands generated by the feedforward harmonic voltage generation module 20 of FIG. 1. While the electric machine frequency is below $\omega_{e1}$, plot 510 illustrates the current commands operating normally in the current injection mode. While the electric machine frequency is above $\omega_{e3}$, plot 520 illustrates the voltage commands operating normally in the voltage injection mode. In the electric machine frequency range between $\omega_{e1}$ and $\omega_{e3}$, the amplitude of the current commands and the amplitude of voltage commands each ramp toward zero as the electric machine frequency approaches $\omega_{e2}$.

FIG. 6 illustrates graph 600 including amplitude of voltage commands versus electric machine frequency. A vertical axis 604 illustrates an amplitude of voltage commands. A horizontal axis 602 illustrates an electric machine frequency, $\omega_e$. According to the control method of FIG. 6, the $\omega_{e1}$ value may be defined where a ramping down of the amplitude of voltage commands may begin to be utilized, with the amplitude of the voltage commands incrementally reducing as an increasing electric machine frequency approaches $\omega_{e2}$. The $\omega_{e2}$ term is the same value as the $\omega_{e2}$ value from FIG. 5. Similarly, a $\omega_{e3}$ value may be defined, where the amplitude of voltage commands ramps up as the electric machine frequency increases past $\omega_{e2}$, with the amplitude of voltage commands reaching a maximum value at $\omega_{e3}$. Plot 610 is illustrated, showing an amplitude of voltage commands generated by the harmonic current regulators 36 of FIG. 1. Plot 620 is illustrated, showing an amplitude of voltage commands generated by the feedforward harmonic voltage generation module 20 of FIG. 1. While the electric machine frequency is below $\omega_{e1}$, plot 610 illustrates the voltage commands operating normally in the current injection mode. While the electric machine frequency is above $\omega_{e3}$, plot 620 illustrates the voltage commands operating normally in the voltage injection mode. In the electric machine frequency range between $\omega_{e1}$ and $\omega_{e3}$, the amplitude of voltage commands ramp toward zero as the electric machine frequency approaches $\omega_{e2}$. The transition control method described by FIGS. 5 and 6 enable the system to smoothly combine and operate current and voltage injection techniques without causing disturbances in the control system.

Figure 7:
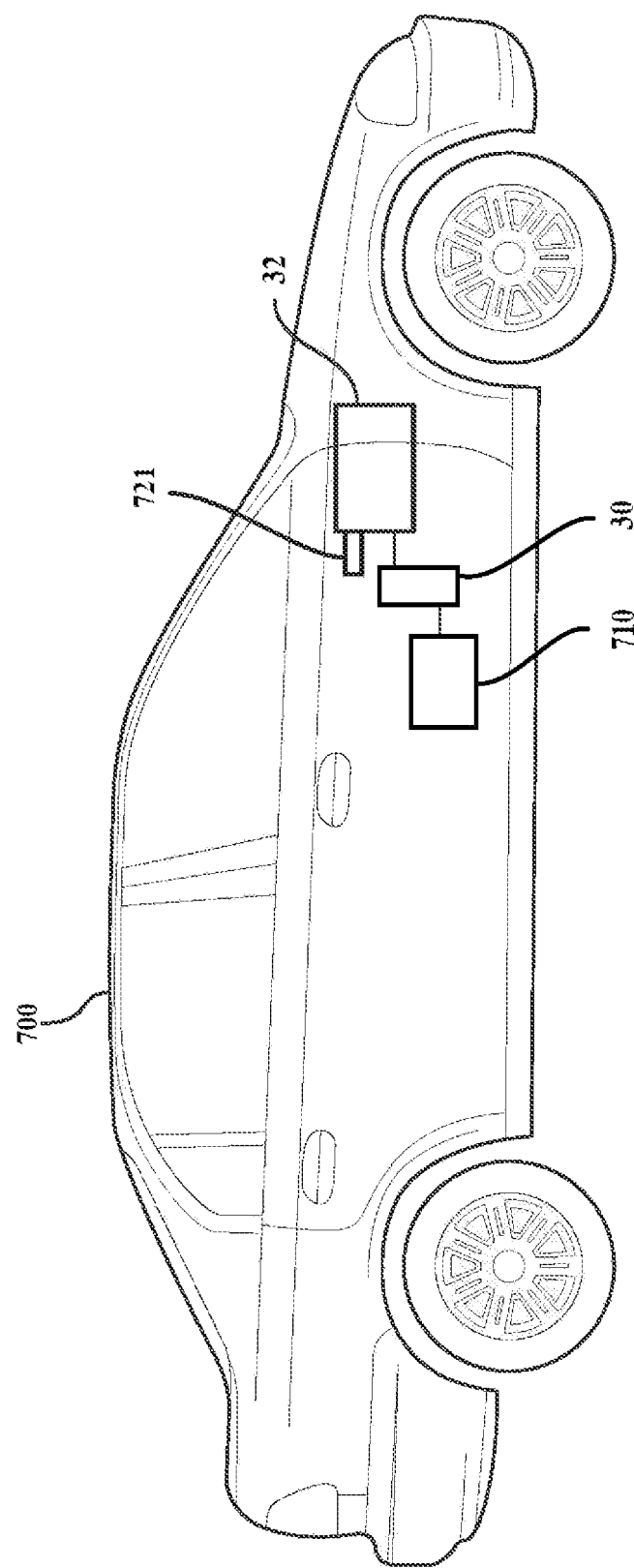
FIG. 7 schematically illustrates an exemplary vehicle including the electric machine of FIG. 1, in accordance with the present disclosure.

FIG. 7 schematically illustrates an exemplary vehicle 700 including the electric machine 32 of FIG. 1. The vehicle 700 is illustrated further including the PWM inverter 30 and a current injection and voltage injection controller 710. The current injection and voltage injection controller 710 is a computerized device operating programming to operate the system and method disclosed herein. The electric machine 32 is illustrated including an output component 721 including a shaft configured for providing an output torque and/or receiving an input torque.

Figure 8:
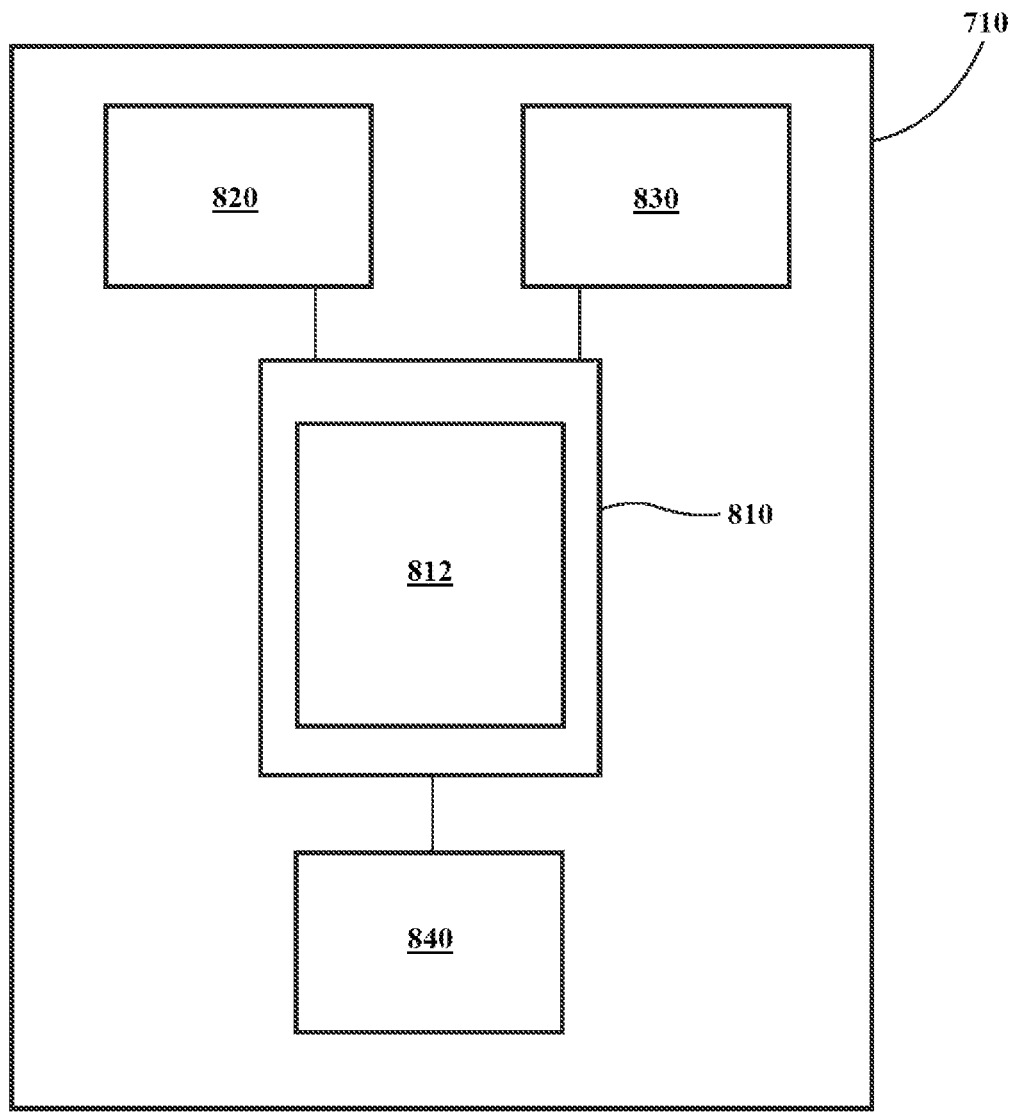
FIG. 8 schematically illustrates the computerized current injection and voltage injection controller of FIG. 7, in accordance with the present disclosure.

FIG. 8 schematically illustrates the computerized current injection and voltage injection controller 710 of FIG. 7. Computerized current injection and voltage injection controller 710 includes processing device 810, communications device 820, data input output device 830, and memory storage device 840. It is noted that computerized current injection and voltage injection controller 710 may include other components and some of the components are not present in some embodiments.

The processing device 810 may include memory, e.g., read only memory (ROM) and random-access memory (RAM), storing processor-executable instructions and one or more processors that execute the processor-executable instructions. In embodiments where the processing device 810 includes two or more processors, the processors may operate in a parallel or distributed manner. Processing device 810 may execute the operating system of the computerized current injection and voltage injection controller 710. Processing device 810 may include one or more modules executing programmed code or computerized processes or methods including executable steps. Illustrated modules may include a single physical device or functionality spanning multiple physical devices. In the illustrative embodiment, the processing device 810 also includes a current injection and voltage injection control module 812, which is described in greater detail below.

The data input output device 830 is a device that is operable to take data gathered from sensors and devices throughout the vehicle and process the data into formats readily usable by processing device 810. Data input output device 830 is further operable to process output from processing device 810 and enable use of that output by other devices or control modules throughout the vehicle.

The communications device 820 may include a communications/data connection with a bus device configured to transfer data to different components of the system and may include one or more wireless transceivers for performing wireless communication.

The memory storage device 840 is a device that stores data generated or received by the computerized current injection and voltage injection controller 710. The memory storage device 840 may include, and is not limited to, a hard disc drive, an optical disc drive, and/or a flash memory drive.

The current injection and voltage injection control module 812 includes programming to operate the system 10 of FIG. 1 and/or the method 400 of FIG. 4.

Computerized current injection and voltage injection controller 710 is provided as an exemplary computerized device capable of executing programmed code to accomplish the methods and processes described herein. A number of different embodiments of computerized current injection and voltage injection controller 710, devices attached thereto, and modules operable therein are envisioned, and the disclosure is not intended to be limited to examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A method to suppress tonal noises over wide speed range in an alternating current electric machine by current injection and voltage injection, the method comprising:
   within a computerized processor,
      monitoring a position sensor generating a current electric machine frequency of the electric machine;
      comparing the current electric machine frequency to a sampling frequency of the position sensor; and
      operating one of a current injection mode and a voltage injection mode to suppress the tonal noises in the electric machine based upon the comparing.

2. The method of claim 1, further comprising, within the computerized processor, determining a harmonic order for the tonal noises in the electric machine to be suppressed based upon the current electric machine frequency and a torque of the electric machine; and
   wherein operating one of the current injection mode and the voltage injection mode includes:
      when the current electric machine frequency is less than the sampling frequency of the position sensor divided by a factor times the harmonic order, modifying a fundamental voltage command for the electric machine with current injection, wherein the current injection is configured for suppressing tonal noises in the electric machine; and
      when the current electric machine frequency is not less than the sampling frequency of the position sensor divided by the factor times the harmonic order, modifying the fundamental voltage command for the electric machine with voltage injection, wherein the voltage injection is configured for suppressing tonal
noises in the electric machine;
wherein the factor is a calibrated value between 6 and
10.

3. The method of claim 2, wherein the factor is 8.

4. The method of claim 2, further comprising:
iteratively determining the harmonic order for the tonal
noises to be suppressed; and
iteratively operating one of the current injection mode and
the voltage injection mode based upon the iteratively
determining the harmonic order.

5. The method of claim 1, further comprising:
monitoring a change in the current electric machine
frequency; and
operating a transition between the current injection mode
and the voltage injection mode based upon the change.

6. The method of claim 5, wherein operating the transition between the current injection mode and the voltage injection mode includes:
within the computerized controller,
determining a harmonic order for the tonal noises in the electric machine to be suppressed based upon the current electric machine frequency and a torque of the electric machine;
defining a first electric machine frequency below which the current injection mode may be operated as the sampling frequency of the position sensor divided by a factor times the harmonic order;
defining a second electric machine frequency less than the first electric machine frequency;
defining a third electric machine frequency greater than the first electric machine frequency;
when the current electric machine frequency is less than the second electric machine frequency, operating the current injection mode at full amplitude;
when the current electric machine frequency is between the first electric machine frequency and the second electric machine frequency, operating the current injection mode with a reduced current command amplitude, wherein the reduced current command amplitude progressively ramps down to zero as the current electric machine frequency approaches the first electric machine frequency;
when the current electric machine frequency is greater than the second electric machine frequency, operating the voltage injection mode at full amplitude; and
when the current electric machine frequency is between the first electric machine frequency and the third electric machine frequency, operating the voltage injection mode with a reduced voltage command amplitude, wherein the reduced voltage command amplitude progressively ramps down to zero as the current electric machine frequency approaches the first electric machine frequency;
wherein the factor is a calibrated value between 6 and 10.

7. The method of claim 1, wherein the current injection mode includes feedforward current commands and feedback voltage commands; and
wherein the voltage injection mode includes feedforward voltage commands.

8. A system to suppress tonal noises over a wide speed range in an alternating current electric machine by current injection and voltage injection, the system comprising:
the electric machine;
a position sensor configured for monitoring operation of the electric machine; and
a computerized current injection and voltage injection controller including programming to:
monitor the position sensor measuring a current electric machine frequency of the electric machine;
compare the current electric machine frequency to a sampling frequency of the position sensor; and
operate one of a current injection mode and a voltage injection mode to suppress the tonal noises in the electric machine based upon the comparing.

9. The system of claim 8, wherein the computerized current injection and voltage injection controller further includes programming to:
determine a harmonic order for the tonal noises in the electric machine to be suppressed based upon the current electric machine frequency and a torque of the electric machine; and
wherein operating one of the current injection mode and the voltage injection mode includes:
when the current electric machine frequency is less than the sampling frequency of the position sensor divided by a factor times the harmonic order, modifying a fundamental voltage command for the electric machine with current injection, wherein the current injection is configured for suppressing tonal noises in the electric machine; and
when the current electric machine frequency is not less than the sampling frequency of the position sensor divided by the factor times the harmonic order, modifying the fundamental voltage command for the electric machine with voltage injection, wherein the voltage injection is configured for suppressing tonal noises in the electric machine;
wherein the factor is a calibrated value between 6 and 10.

10. The system of claim 9, wherein the factor is 8.

11. The system of claim 9, wherein the computerized current injection and voltage injection controller further includes programming to:
iteratively determine the harmonic order for the tonal noises to be suppressed; and
iteratively operate one of the current injection mode and the voltage injection mode based upon the iteratively determining the harmonic order.

12. The system of claim 8, wherein the computerized current injection and voltage injection controller further includes programming to:
monitor a change in the current electric machine frequency; and
operate a transition between the current injection mode and the voltage injection mode based upon the change.

13. The system of claim 12, wherein operating the transition between the current injection mode and the voltage injection mode includes:
determining a harmonic order for the tonal noises in the electric machine to be suppressed based upon the current electric machine frequency and a torque of the electric machine;
defining a first electric machine frequency below which the current injection mode may be operated as the sampling frequency of the position sensor divided by a factor times the harmonic order;
defining a second electric machine frequency less than the first electric machine frequency;
defining a third electric machine frequency greater than the first electric machine frequency;
when the current electric machine frequency is less than the second electric machine frequency, operating the current injection mode at full amplitude;

when the current electric machine frequency is between the first electric machine frequency and the second electric machine frequency, operating the current injection mode with a reduced current command amplitude, wherein the reduced current command amplitude progressively ramps down to zero as the current electric machine frequency approaches the first electric machine frequency;

when the current electric machine frequency is greater than the second electric machine frequency, operating the voltage injection mode at full amplitude; and when the current electric machine frequency is between the first electric machine frequency and the third electric machine frequency, operating the voltage injection mode with a reduced voltage command amplitude, wherein the reduced voltage command amplitude progressively ramps down to zero as the current electric machine frequency approaches the first electric machine frequency;

wherein the factor is a calibrated value between 6 and 10.

14. The system of claim 8, wherein the current injection mode includes feedforward current commands and feedback voltage commands; and wherein the voltage injection mode includes feedforward voltage commands.

15. A system to suppress tonal noises in a vehicle over a wide speed range in an alternating current electric machine by current injection and voltage injection, the system comprising:

the vehicle including:
the electric machine;
a position sensor configured for monitoring operation of the electric machine; and
a computerized current injection and voltage injection controller including programming to:
monitor the position sensor measuring a current electric machine frequency of the electric machine;
compare the current electric machine frequency to a sampling frequency of the position sensor; and
operate one of a current injection mode and a voltage injection mode to suppress the tonal noises in the electric machine based upon the comparing.

16. The system of claim 15, wherein the computerized current injection and voltage injection controller further includes programming to:

determine a harmonic order for the tonal noises in the electric machine to be suppressed based upon the current electric machine frequency and a torque of the electric machine; and wherein operating one of the current injection mode and the voltage injection mode includes:

when the current electric machine frequency is less than the sampling frequency of the position sensor divided by a factor times the harmonic order, modifying a fundamental voltage command for the electric machine with current injection, wherein the current injection is configured for suppressing tonal noises in the electric machine; and when the current electric machine frequency is not less than the sampling frequency of the position sensor divided by the factor times the harmonic order, modifying the fundamental voltage command for the electric machine with voltage injection, wherein the voltage injection is configured for suppressing tonal noises in the electric machine;

wherein the factor is a calibrated value between 6 and 10.

17. The system of claim 16, wherein the computerized current injection and voltage injection controller further includes programming to:

iteratively determine the harmonic order for the tonal noises to be suppressed; and iteratively operate one of the current injection mode and the voltage injection mode based upon the iteratively determining the harmonic order.

18. The system of claim 15, wherein the computerized current injection and voltage injection controller further includes programming to:

monitor a change in the current electric machine frequency; and operate a transition between the current injection mode and the voltage injection mode based upon the change.

19. The system of claim 18, wherein operating the transition between the current injection mode and the voltage injection mode includes:

determining a harmonic order for the tonal noises in the electric machine to be suppressed based upon the current electric machine frequency and a torque of the electric machine;

defining a first electric machine frequency below which the current injection mode may be operated as the sampling frequency of the position sensor divided by a factor times the harmonic order;

defining a second electric machine frequency less than the first electric machine frequency;

defining a third electric machine frequency greater than the first electric machine frequency;

when the current electric machine frequency is less than the second electric machine frequency, operating the current injection mode at full amplitude;

when the current electric machine frequency is between the first electric machine frequency and the second electric machine frequency, operating the current injection mode with a reduced current command amplitude, wherein the reduced current command amplitude progressively ramps down to zero as the current electric machine frequency approaches the first electric machine frequency;

when the current electric machine frequency is greater than the second electric machine frequency, operating the voltage injection mode at full amplitude; and when the current electric machine frequency is between the first electric machine frequency and the third electric machine frequency, operating the voltage injection mode with a reduced voltage command amplitude, wherein the reduced voltage command amplitude progressively ramps down to zero as the current electric machine frequency approaches the first electric machine frequency;

wherein the factor is a calibrated value between 6 and 10.

20. The system of claim 15, wherein the current injection mode includes feedforward current commands and feedback voltage commands; and wherein the voltage injection mode includes feedforward voltage commands.

* * * * *